United States Patent Office 3,261,692
Patented July 19, 1966

3,261,692
METHOD OF PREPARING A FROZEN SALT-CONTAINING MEAT PRODUCT
Stephen S. Chang, Franklin Park, and Peter X. Hoynak, Jr., Wayne, N.J., assignors to Rutgers Research and Educational Foundation, New Brunswick, N.J., a corporation of New Jersey
No Drawing. Filed Mar. 1, 1963, Ser. No. 262,201
4 Claims. (Cl. 99—194)

This invention relates to the preservation of salt-containing food products that have a content of unsaturated lipids, and is particularly concerned with meat, including ground meat products such as sausage, which is to be prepared with a content of salt and which is then to be kept for a considerable time in an uncooked state. The term "salt" is used herein to mean common salt, i.e., sodium chloride, unless otherwise indicated. Similarly, the term "meat product" is employed to include meat in various forms, i.e., being not only ground or otherwise processed meat but also meat which may have been modified in no other way than by the incorporation of salt.

The inclusion of a content of salt is highly desirable in various meat products, of which one example is so-called breakfast sausage, being a meat material that is made essentially of ground pork and preferably contains, for flavoring purposes, a quantity of salt that is mixed in and thus becomes an ingredient of the product. Experience has shown, however, that although the keeping qualities of fresh pork are relatively good in its untreated state, the presence of salt has a markedly adverse effect, apparently in promoting the development of rancidity. It is understood that such rancidity occurs through oxidation of the unsaturated lipids, i.e., in that the unsaturated fatty acid constituent material is oxidized to hydroperoxides, which in turn decompose into products that impart the objectionable taste or odor, commonly characterized as rancidity in meat. In some way, not fully understood, the presence of salt in the meat product, especially the fresh, i.e., uncooked meat, has a tendency to advance the process of rancidification, possibly in a catalytic manner. As indicated, the products which have been cooked or subjected to cooking temperatures, as in smoking, are considerably less susceptible than uncooked meat to the effect of salt in promoting rancidity; indeed such meat products containing salt can be safely kept at ordinary (non-freezing) refrigeration or even high temperatures for rather extended periods of time, without rancidity development.

On the other hand, in the case of fresh, essentially uncooked meat products, such as pork, the presence of salt has a distinctly deleterious effect as explained above, i.e., promoting reactions that cause rancidity. Furthermore, the difficulty is very greatly heightened in the case of frozen meat material of this sort, indeed to the extent that salt-containing pork products, for example, whether fresh or processed by cooking, smoking or the like, cannot usually be kept for more than a few days in a fully frozen state, without significant deterioration.

For instance, fresh pork sausage made without salt, ordinarily has a shelf life of about 4 to 6 months at 0° F. If the same sausage is made, however, to have a content of about 2% salt by weight, its shelf life is decreased to less than 2 weeks at 0° F. Indeed this difficulty of preservation in the frozen state is found to arise wherever salt has been included, not only in other forms of fresh pork, i.e., ordinary cuts of pork, but even in pork that has been processed by some cooking or similar operation. It also occurs, to an appreciable extent, in the case of other meats containing salt, such as beef or lamb. Thus so-called cured meats, meaning simply meats that have been treated with salt, largely for flavoring purposes, have not been generally available in a frozen state, for the reason that cured meat, when frozen, has tended to have a poor shelf life.

Although storage of food products in a frozen condition has been valuable in many cases for the preservation of the product with all or most of its desired properties over very long periods of time, and indeed although many uncured meats have been satisfactorily kept in this manner, such operation has not been generally applicable to cured, i.e., salt-containing meat. According to investigation or understanding reached in the course of origination of the present invention, it is believed that the freezing operation causes the salt, which may have gone into solution in the moisture content of the meat (whether in its lean or fat parts), to crystallize in place, the further belief or understanding being that the catalytic or like effect of salt in promoting rancidity is greatly enhanced by the presence of salt as small crystals. Whatever the reason, however, it is nevertheless the fact that cured meat has relatively poor keeping quality in the frozen state. As indicated above, moreover, fresh (i.e., uncooked) meat is generally characterized by greater tendency to become rancid than unsalted meat, i.e., at any temperature of storage; although these difficulties are particularly severe in the case of fresh pork, they are at least appreciable in other meats.

Beside meat, which has a natural content of unsaturated lipids, there are other food products, prepared to have a content of such character, that may suffer from the rancidity-promoting effect of salt when the product is sought to be stored in a frozen state. For example, frozen doughs for baked products, such as doughs for biscuits, bread, or the like, are usually prepared to contain fats or oils or both, and salt, along with the flour (e.g., wheat flour), leavening agent and liquid as and if required, and any other conventional ingredients. The present invention is therefore also designed to improve the shelf life of frozen products other than meat, e.g., such as frozen dough that is intended for use in making baked articles.

For the amelioration or avoidance of the problems described above, the invention is directed to new meat and other products and to methods of making or preserving such products, and materials used for such purpose, with the result of providing meat, or other food product, that may contain salt to a desired extent for flavoring or like purposes and that nevertheless may be kept effectively for long periods of time under conditions where the product would otherwise tend to develop rancidity. For the attainment of these ends, the invention involves the discovery that the acceleration of rancidity development may be greatly reduced or indeed essentially avoided by including and maintaining the salt in the form of salt particles coated with an effective layer of solid fat which itself has good flavor stability. In particular, the granular salt is first treated or made up to carry the defined fat coating, i.e., being in effect a complete layer or coating around each salt particle, of a suitable fat which is solid at processing and storage temperatures (usually including room temperature), but which will melt at the temperatures at which the meat may later be cooked. In some cases, as more fully explained below, the coating may consist of two or more layers of fat, e.g., of respectively different composition. The salt so prepared, i.e., with single or plural coatings, is mixed or otherwise incorporated into the food product, i.e., the meat, it being found that the development of rancidity is then greatly retarded, as compared with identical meat similarly made to contain salt which is uncoated. When the meat is later cooked for use, the fat coating of the salt is melted, so that the taste of the salt is fully released in the food product, with full effect equal to that of freshly prepared meat containing untreated salt.

Thus in the practice of the invention, the salt, i.e., sodium chloride, in conventional finely granular form, is first coated with a thin but effective layer of suitable fat, for instance hydrogenated cottonseed oil, which is appropriately solid at room temperatures or somewhat higher and which is not susceptible to rancidification or like deterioration under the circumstances of use as here described. A quantity of the specified fat, equal to 35% or 40% by weight of the salt, may be melted and mixed with the salt, with stirring continued as the mixture cools so as to yield a mass of individual particles each consisting of the salt crystal or granule having the requisite coating. Then the desired quantity of the specially prepared salt material is added to the meat product, i.e. in any conventional way in which meats are salted or in which prepared products such as sausage are made up to contain salt. Thus in the case of fresh pork sausage, suitable ingredients such as lean pork and pork fat are ground and mixed together to yield a sausage base, and the salt in appropriate amount, as for flavoring, is thoroughly mixed into the mass.

As explained, it is found that the food material, for example, a meat product, containing the coated salt can be frozen and kept in the frozen state, without objectionable deterioration, for long periods of time, even a matter of months. In contrast, a like meat product, similarly made but containing ordinary, uncoated salt, is found to develop rancidity rather rapidly when the product is frozen and kept in such condition; two or three weeks is generally the longest shelf life attainable before the meat becomes useless, and indeed the useful storage time is often considerably less. The significance of the employment of the coated salt is very apparent, over a range of salt contents, with the objectionable effects of salt being fully exhibited even with 2% or somewhat less in the meat, as may well suffice for seasoning purposes. In the comparative treatments just described, incorporating 2% by weight of salt in the meat, the procedure of the invention quite effectively obviated the acceleration of rancidity otherwise occasioned by salt, yet upon subsequently cooking the product, the flavoring effect of the salt was fully realized, and indeed there was no difference in appearance or taste between the product made and stored with coated salt, and a freshly made product including ordinary uncoated salt.

It will also be seen that the coated salt itself, which has good stability and may be kept for relatively long periods of time, represents a new article, having special use in the preparation of food products such as meats or other products, as of the character described.

Various fats may be used for the salt coating, provided selection is made, in accordance with known properties of such materials, so as to attain the desired characteristics. The fat must be appropriately stable under the conditions of expected use and over extended periods of time, i.e., particularly in that it should have flavor stability and should not be of such nature as to deteriorate or become rancid itself in the present of salt or otherwise. Thus although a small content of some unsaturated lipid material may be tolerated, the fat should be free of highly unsaturated lipids (such as linolenic or arachidonic acid), that might be significantly sensitive to deteriorating influences. The fat should of course be such that it does not adversely affect the flavor of the food product; indeed it is preferably selected to be an essentially flavorless or bland material.

An important criterion of the selected fat is that it have a melting point sufficiently high to keep it solid under the circumstances of use and throughout a period of storage of the food product in which the coated salt is incorporated. Hence in general, the fat should have a melting point well above room temperature, i.e. above temperatures of 80° to 85° F., and preferably considerably higher, as may be necessary if the coated salt is to be kept as a stock product, in advance of use, under circumstances where the ambient temperature may rise to higher values, such as 100 °F. The melting point should be no higher than the temperature at which the food product will ultimately be cooked. In a broad sense (unless otherwise stated) this and other references to cooking operations herein include, reheating and indeed any treatment whereby the product, in ordinary preparation for consumption, is thoroughly warmed or heated to a temperature which is substantially above ambient temperatures, but which may be lower than temperatures reached in the common cooking steps of frying, boiling and the like. Thus in many cases the melting point of the fat should be no more than, say, 150° F., and indeed it is presently preferred that the melting point be no higher than sufficient to assure the fat remaining solid until the food product is prepared for use. On the other hand, in the case of products that are subjected to relatively high temperature cooking operations as in broiling or the like, it is conceived that fats of higher melting point may be employed, again so long as the selected coating material will in fact melt and release the salt before the meat product is to be consumed.

It is also conceived that, in some special cases, as for the preparation of food to be frozen, relatively lower melting point fats may be employed, when special precautions are taken to complete the preparation of the coated salt and its incorporation into the meat product, as, for example, at relatively reduced or, even refrigeration, temperatures. Indeed, where the invention is found applicable to meat products which may have been suitably processed before final formulation with salt, and where no final cooking is contemplated, special utility may be found for fat coatings of relatively low melting point, providing the coating is fully solidified on the salt, and thereafter kept in solid state during addition of the coated salt to the product and during storage of the product. In such case, the melting point would preferably be not higher than about 95° F., and if possible considerably lower, to insure release of the salt by melting the fat under body temperature when the food product is eaten.

Examples of fat suitable for the coating, and coming within the limitations of selection as indicated above, are various hydrogenated vegetable oils and the like, such as hydrogenated soy bean oil, hydrogenated cottonseed oil, hydrogenated coconut oil, hydrogenated safflower oil and hydrogenated forms of peanut oil, palm kernel oil and corn oil. Other edible fats meeting the general requirements include various hydrogenated animal fats, i.e., hydrogenated tallows, lard, mutton tallow and the like, as well as some animal fats that are suitable without hydrogenation. Other edible modified fats are appropriate such as so-called interesterified lard, and acetylated fats (sometimes called acetin fat), which are substances, derived from lard or various vegetable or other animal fats, wherein the fatty acid is in part replaced with acetic acid. Suitable substances may also be obtainable by fractionation of vegetable and animal oils or fats so as to separate products of usefully higher melting point from fractions of lower melting point.

While at least many of the substances named above are triglycerides, monoglycerides and diglycerides are also generally suitable, where characterized by appropriate melting points as explained above. In general, the triglycerides are preferable, in that lower glycerides, such as glyceryl monostearate, may be more hydrophilic and exhibit some tendency to conduct moisture through the coating to the salt, for premature dissolution and release of the latter. Under certain circumstances, such characteristics may not be wholly objectionable, or may even be permissible or desirable in mixtures of such substances with conventional hydrogenated fats. It will also be understood that the fat may be a mixture of specific compounds, and indeed may include fats of relatively low melting point, as where such are useful in order to reduce the melting point of other ingredients to a desired value for the complete coating composition.

A further desirable property, which characterizes the specific fats named above, is a measure of plasticity, i.e., in that the selected fat should not become brittle or cracked over a period of time. However, where two or more successive coatings are applied to the salt particles, the problem of plasticity is of less significance, in that usually there will be small likelihood of cracks developing in both coatings at the same places, and in consequence the integrity of the laminated coating around the particle may remain sufficient for the desired avoidance of exposure of the salt in the meat product. For long storage times, acetin fat, having exceptional plasticity, is notably useful as part or all of the coating material.

While it is usually preferable to include no more fat than required to maintain the isolated condition of the salt particles, it is ordinarily desirable that the coating be more than a mere film or the like. There should be sufficient fat to insure complete coating of each granule or crystal of salt, and to maintain the coating in effective condition during handling and storage (including any mechanical or like processing) after addition of the coated salt to the meat. In theory, of course, a unimolecular or similarly thin film ought to suffice if the coating method is effective to cover each salt particle completely with such film and if circumstances of addition of the salt to the food product allow the integrity of the film to be maintained. According to present understanding as expressed above, however, a more considerable quantity of total coating should be used (in the case of products such as meat), e.g., at least about 2% of fat by weight, based on the total amount of salt, i.e., meaning 2 parts by weight of fat for each 100 parts by weight of salt. Preferably amounts of the order of 20% to 60% by weight of fat are employed in practice, i.e. relative to the salt, for assurance of good results. While quite substantially larger amounts of fat may be utilized, within limits of economy or of undesired modification of the taste or structure of the food product, it is ordinarily found that more than 100% of fat, again based on the salt, is unnecessary The operation of coating the salt can be accomplished in any of a number of ways. A simple batch-type process involves melting the fat in a suitable kettle or like vessel at a temperature above is melting point so that it is fully fluid, and then adding the salt in correspondingly correct amount. The mixture is then stirred so as to afford a thorough coating of all of the salt particles with the molten fat, whereupon the material is allowed to cool down to temperature well below the fat melting point, while stirring is continued. The result is a mass of coated particles, with the fat solidified in place, and in the desired quantitative relationship, the amount of fat being the selected percentage relative to the weight of the salt incorporated. Other modes of coating the salt particles including various spraying or blowing techniques may be used. For example, a stream of the salt particles can be propelled upward by a suitable current of air or gas, while molten fat is sprayed into the stream and the coated particles are collected in a cooled locality where the coatings have solidified as the particles are accumulated. Another process involves preparing a mixture of the molten fat with the salt particles therein, and then spraying such mixture into a cool region so that the coatings solidify as the particles fall or are propelled into such region. In all cases, the object is to attain a body of salt particles with the solid fat coating on each.

Where, for greater security of isolation of the salt particles, it is desired to apply plural coatings, e.g., of different fats, the same types of treatment may be employed. When the batch-type of process, utilizing a body of melted fat into which the salt particles are mixed, is used, it is apparent that the first-applied or inner coating on the salt should be of a fat having a higher melting point than the second coating. Thus in such process, the salt particles coated with a solidified layer of the higher melting point fat are mixed into a molten body of the lower melting point material, care being taken to be sure that the temperatures of the latter is kept below the melting point of the first coating. Upon stirring the second-established mixture, until the lower-melting fat solidifies, a mass of salt particles results having two coating layers on each, as desired.

On the other hand, in the several spraying or blowing techniques, where essentially instantaneous cooling and solidification of the fat can be achieved, it is not generally necessary that the second-applied coating be of a material having a lower melting point than the first. Indeed with extremely rapid cooling, especially where the first-coated particles are blown through a spray of the second coating material, it is possible that the second material may be appreciably higher in melting point, i.e., providing the circumstances are such that it in effect freezes on the salt particles before sufficient heat is imparted to melt the first coating to a significant extent.

Ordinarily, the salt should be relatively fine, i.e., fine particles, in that coarse granules or crystals are in most cases unsatisfactory for the ultimate flavoring function in the meat product. In the latter case, when the fat coating is melted so as to make the salt accessible, the effect on the taste of the product is apt to be uneven since a given amount of very coarse granules cannot be as thoroughly or uniformly distributed as a like quantity of small particles. Moreover, large particles may not even completely dissolve, so that the eating qualities of the product are impaired by the presence of physically discrete salt granules. It does not appear that the shape of the salt particles is of seriously critical significance, i.e., whether in the nature of smooth granules or more or less cubic crystals or as flakes; in general all of these appear to be susceptible of effective coating as in one or another of the ways described above. Indeed the coating operation is believed to function satisfactorily, i.e. in achieving an effective covering of the salt, over a wide range of particle sizes. A practical limitation in many cases is, however, that a fine salt requires a correspondingly larger amount of fat in order to achieve the coating, than does a coarse salt. This is apparent from the fact that the total surface area of a given weight of small particles is greater than that of a like weight of large particles. One useful example is provided by the salt particles in a size range such that nearly all will pass a ½ mm. screen and will be held on a ⅛ mm. screen. For use with meats such as sausage or the like, it is presently best to use salt in the size range of a 1/64 mm. screen to a 2 mm. screen.

As will be apparent, the quantity of salt employed in the meat or like food products depends essentially on the seasoning or other purpose served by the salt. By way of example, flavoring purposes are usually served by amounts of salt from 1% to 5%, based on the weight of the meat, but as indicated, the purposes of the coating in avoiding acceleration of rancidity or the like are fully served in any case where the salt would otherwise, i.e., if uncoated, have a deteriorating effect. It is recognized, of course, that in the past, very large quantities of salt have sometimes been employed in meat or similar products for preservative action, e.g., amounts usually above 5% by weight. In such cases, where other effects of the salt preclude its rancidity-accelerating function, it is apparent that the present process would likely have no application; however, if relatively large amounts of salt are desired without commingling of the sodium chloride in the product, the use of the coating or coatings as herein described should be fully effective.

In adding the coated salt to meat, no unusual operation is involved; for example, in the case of sausage, coated salt is simply mixed into the ground meat in a thorough fashion, just as would be done in the case of uncoated salt. It is important, of course, to be sure to attain a thorough mechanical mixing if uniform distribution is desired, inasmuch as there is no penetration of the salt in solution. Care should also be taken to keep the temperature below the melting point of the coating on the salt. Addition or incorporation of the coated salt into other types of meat may be achieved in appropriate fashion, e.g., as by mildly pounding or working it into the product. It will be appreciated that, with appropriate choice of melting point for that fat, some processing of the meat product, even involving mild heating, may be performed without destroying the fat layers on the salt particles. For instance, some smoking operations, achieved with the aid of electrical charges, have been performed at relatively low temperatures, and it is apparent that these may be utilized with materials that contain the present coated salt and that are thereafter to be stored, e.g. frozen, while maintaining the integrity of the fat layers on the salt.

The following are specific examples of the invention:

*Example I*

One kilogram of lean pork and one kilogram of pork fat (being fresh meat) were mixed and made into sausage material, with a conventional meat grinder. The resulting body of sausage was separated into two equal portions. 20 grams of uncoated, i.e., ordinary, salt were added and thoroughly mixed into one portion. 20 grams of salt which had been effectively coated (as by the batch method described above) with 7.4 grams of a 58 titer hydrogenated cottonseed oil were added and thoroughly mixed into the other portion. This was a fat having a melting point of about 140° F., and afforded a fully solid coating on the salt particles, under room temperature conditions at which the process wos carried out. As will be seen, the amount of salt used, i.e., measured as sodium chloride, was 2% of the weight of the meat product in each case, the coated salt, including the coating material, representing 2.74%. In this and in other examples below, the salt was relatively fine, having a particle size within the range of a ⅛ mm. screen and a ½ mm. screen.

After mixing, portions of each batch of salt-containing sausage were cooked and examined; there was no difference in appearance and taste between them. However, the sausage made with uncoated salt discolored after storage at 32° F. for 48 hours, while after storage of the sausage containing coated salt under the same temperature for the same time, the product showed no discoloration.

Portions of each batch were frozen and stored continuously at 0° F. for an extended time, samples being taken and tested for rancidity after various intervals. For comparison purposes an identical composition of pork sausage, without any salt at all, was similarly frozen and stored, tests being likewise made on samples of the unsalted meat. Rancidity was determined by the standard thiobarbituric acid test, known as TBA value, this being a well known procedure for determining rancidity in meat or other products having a significant content of highly unsaturated fats. TBA values were measured in conventional manner as milligrams of malonaldehyde per 100 grams of the product tested, i.e. the sausage, it being understood that values are relative and that whereas objectionable rancidity may not be deemed present until the TBA value reaches about 0.2, the rise of values over a period of time is also significant as indicating the rate of the rancidification process. The following are results of tests made on the three batches of sausage stored under frozen condition as noted above:

TABLE 1

| Days in Storage at 0° F. | TBA Values of Sausage Made With— | | |
|---|---|---|---|
| | No Salt | Salt | Coated Salt |
| 1 | .130 | .150 | .055 |
| 3 | .140 | .162 | .070 |
| 11 | .145 | .190 | .050 |
| 33 | .150 | .265 | .080 |
| 54 | .162 | .290 | .095 |

It will be noted that meat with the coated salt kept remarkably well over a period of nearly three months, even better than the completely unsalted meat, whereas the rancidity developed quite rapidly in the sausage containing ordinary, uncoated salt, reaching objectionable values in less than two weeks.

*Example II*

Sausage batches similar to the fresh pork sausage of Example I, were in this instance made with beef and leg of lamb respectively, and freezing storage tests were run as to batches respectively containing no salt, ordinary salt, and salt coated with one layer of hydrogenated cottonseed oil, the proportions and the coating of the salt being as specified in Example I. The rates of development of rancidity are shown in the following table:

TABLE 2

| Days in Storage at 0° F. | TBA Values of Sausage Made With— | | |
|---|---|---|---|
| | No Salt | Salt | Coated Salt |
| A. Beef: | | | |
| 1 | .065 | .074 | .063 |
| 4 | .070 | .083 | .071 |
| 7 | .074 | .090 | .072 |
| B. Leg of Lamb: | | | |
| 1 | .055 | .060 | .053 |
| 4 | .060 | .071 | .058 |
| 7 | .064 | .080 | .061 |

As will be noted, even in a short period of storage the rate of rancidity development was appreciably higher in the case of meat containing ordinary salt, as compared with unsalted meat and the product embodying coated salt in accordance with the present invention.

*Example III*

In this instance, various forms of coated salt were employed, having plural layers of fats. The meat employed was pork, made up into sausage exactly as in Example I, and in the case of salt addition, the latter was effected in the proportion of 2% of sodium chloride, based on the weight of the meat treated. Three separate types of the coated salt were employed, as follows:

A. A quantity of 100 grams of salt (sodium chloride) was coated with 25 grams of 58 titer hydrogenated cottonseed oil as the inner layer. Over this there was applied, as an outer layer, 9 grams of a mixture composed, by weight, of 90% of 58 titer hydrogenated cottonseed oil and 10% of an acetin fat, known as MD-1 Myvacet.

B. A quantity of 100 grams of salt was coated with 26 grams of 58 titer hydrogenated cottonseed oil as the inner layer, and then with an outer layer consisting of 14 grams of a mixture of 90% of 58 titer hydrogenated cottonseed oil and 10% of coconut oil.

C. A quantity of 100 grams of salt was coated with 26 grams of 58 titer hydrogenated cottonseed oil as the inner layer, then with 8 grams of a mixture of 80% of 58 titer hydrogenated cottonseed oil and 20% of a commercial shortening agent (of vegetable oil origin) known as Spry, to constitute a middle layer. An outer or third layer was then applied, consisting of 3 grams of a mixture of 90% of 58 titer hydrogenated cottonseed oil and 10% of coconut oil.

Samples of sausage, respectively containing coated salt of the three formulas specified above, were stored in frozen condition at 0° F., along with similar samples containing ordinary uncoated salt and unsalted samples, the amount of salt in each case being equal to 2% of actual salt, as noted above. Rancidity determinations, made in the manner stated for Example I, were effected after various intervals, the results being as set forth in the following:

TABLE 3

| Days in Storage at 0° F. | TBA Values of Sausage Made With— | | |
|---|---|---|---|
| | No Salt | Salt | Coated Salt |
| With Coated Salt A: | | | |
| 1 | .078 | .185 | .075 |
| 8 | .085 | .200 | .080 |
| 15 | .090 | .230 | .084 |
| 28 | .130 | .250 | .125 |
| With Coated Salt B: | | | |
| 1 | .130 | .150 | .140 |
| 3 | .140 | .162 | .105 |
| 11 | .145 | .190 | .140 |
| 33 | .150 | .265 | .100 |
| 54 | .162 | .290 | .110 |
| With Coated Salt C: | | | |
| 1 | .130 | .150 | .120 |
| 3 | .140 | .162 | .090 |
| 11 | .145 | .190 | .120 |
| 33 | .150 | .265 | .105 |
| 54 | .162 | .290 | .115 |

Again it will be seen that in the case of the meat made with coated salt, the acceleration of rancidity as appeared with the meat containing ordinary salt, was entirely avoided.

It will be apparent that the products and procedures of the invention are eminently useful wherever it is desired to provide a salt-containing food product, such as a salted or cured meat product, or dough or other product, and to handle or store such product, even for ordinary times of distribution and sale, where the use of plain salt would be objectionable because of its tendency to promote rancidity. Examples of various meats have been given hereinabove, but it is apparent that other meats and food products may likewise embody the coated salt, such as various baking dough products or articles to be kept in frozen state, a still further instance being frozen, prepared meals which may contain ground meats or the like (e.g., beef) that would very desirably be salted in advance, but have not hitherto been made up to contain salt, because of rancidity problems.

It is to be understood that the invention is not limited to the specific compositions and operations described herein, but may be carried out in other ways without departure from its spirit.

We claim:

1. A method of preparing a frozen salt-containing meat product which contains unsaturated lipid that is subject to rancidity, said salt being sodium chloride, comprising coating particles of sodium chloride with edible fat having a melting point substantially above room temperature to produce a product consisting essentially of sodium chloride coated with such solid fat, said solid fat being present on the salt in an amount of at least 2% by weight of the salt, adding said fat-coated salt to said meat and freezing said salt-containing meat product while maintaining the fat coating on the salt particles in solid condition to prevent access of said salt particles to the unsaturated lipid in the frozen meat product.

2. A method as defined in claim 1, in which the meat of the said meat product is comminuted meat, said fat-coated salt being added by mixing it with said comminuted meat.

3. A method of preparing a frozen salt-containing edible product which contains unsaturated lipid that is subject to rancidity, said salt being sodium chloride, comprising coating particles of sodium chloride with edible fat having a melting point substantially above room temperature to produce a product consisting essentially of sodium chloride coated with such solid fat, said solid fat being present on the salt in an amount of at least 2% by weight of the salt, adding said fat-coated salt to said edible product and freezing said salt-containing edible product while maintaining the fat coating on the salt particles in solid condition to prevent access of said salt particles to the unsaturated lipid in the frozen edible product.

4. A method of preparing frozen fresh pork sausage which consists essentially of comminuted fresh pork and which contains salt, said salt being sodium chloride, comprising coating particles of sodium chloride with edible fat having a melting point substantially above room temperature to produce a product consisting essentially of sodium chloride coated with solid fat, said solid fat being present on the salt in an amount of at least 2% by weight of the salt, adding said fat-coated salt in distribution into the said comminuted fresh pork and freezing the resulting salt-containing fresh pork sausauge while maintaining the fat coating on the salt particles in solid condition to prevent access of said salt particles to the comminuted fresh pork.

References Cited by the Examiner

UNITED STATES PATENTS

| 2,246,528 | 6/1941 | Musher. | |
| 2,518,247 | 8/1950 | Nairn. | |
| 2,551,463 | 5/1951 | Ramsbottom | 99—169 |
| 2,634,212 | 4/1953 | Komarik | 99—140 |
| 2,645,581 | 7/1953 | Robison | 99—143 |
| 3,052,560 | 9/1962 | Delaney | 99—222 |

FOREIGN PATENTS

| 15,429 | 9/1895 | Great Britain. |

A. LOUIS MONACELL, *Primary Examiner.*

HYMAN LORD, *Examiner.*